Aug. 1, 1939.   R. S. BUTLER   2,168,091
SIZE-REDUCING APPARATUS
Filed Aug. 26, 1935   6 Sheets-Sheet 1

Inventor:
Robert S. Butler
by Louis A. Maxson
Atty.

Aug. 1, 1939. R. S. BUTLER 2,168,091
SIZE-REDUCING APPARATUS
Filed Aug. 26, 1935 6 Sheets-Sheet 2

Inventor:
Robert S. Butler.
by Louis A. Maxson
Atty.

Aug. 1, 1939.   R. S. BUTLER   2,168,091
SIZE-REDUCING APPARATUS
Filed Aug. 26, 1935   6 Sheets-Sheet 3

Inventor:
Robert S. Butler,
by
Louis A. Maxson.
Atty.

Inventor:
Robert S. Butler.
by
Louis A. Maxson.
Att'y.

Aug. 1, 1939. R. S. BUTLER 2,168,091
SIZE-REDUCING APPARATUS
Filed Aug. 26, 1935 6 Sheets-Sheet 6

Inventor:
Robert S. Butler.
by
Louis B. Maxson,
Atty.

Patented Aug. 1, 1939

2,168,091

UNITED STATES PATENT OFFICE 2,168,091

SIZE-REDUCING APPARATUS

Robert S. Butler, Claremont, N. H., assignor to Sullivan Machinery Company, a corporation of Massachusetts Application August 26, 1935, Serial No. 37,804

19 Claims. (Cl. 83—9)

My invention relates to apparatus for effecting size-reduction of material, and in certain aspects thereof to apparatus especially adapted for fine grinding operations. In appropriate embodiments, it may be used, in certain of its aspects, for crushing, grinding, or pulverizing or for combinations of these operations.

It is a general object of my invention to provide an improved material size-reducing mill of an improved construction, of relatively small size and light weight, as compared with present commercial mills, and requiring a minimum amount of power in proportion to the size-reduction accomplished.

To this end, it is an object of my invention to provide a size-reducing chamber of improved construction provided with an appropriate quantity of size-reducing media of the proper kind and size and operative through movement of said chamber to effect size-reduction of material delivered thereto through the most effective combination of impact, attrition, and internal working within the size-reducing chamber contents.

It is another object of my invention to provide an improved arcuate, or otherwise suitably curved size-reducing chamber containing an appropriate charge of size-reducing media of different sizes, and effective: through oscillatory movement of said chamber to cause in rapid alternation radial and tangential compacting of the chamber contents and thereby an improved reducing action; through the shape and movement of said chamber to effect classification of the size-reducing media and of the material admitted to said chamber whereby as the size of the pieces of material progressively diminishes said pieces are successively acted upon by smaller sizes of size-reducing media; and through the substantially constant activity of the material and size-reducing media to provide a maximum rate of processing and an avoidance of under-size-reduction through short-circuiting of material within the chamber.

It is a further object of my invention to provide an improved size-reducing chamber provided with a quantity of size-reducing media, and, through the form and motion of said chamber and the proper determination of the quantity of size-reducing media employed, effective to attain during material-processing maximum efficiency of operation, and, upon interruption or predetermined reduction in rate of material supply, to reduce the power consumption to a small fraction of the full load requirements due to a complete change in the nature of the motion of the chamber contents.

Still another object of the invention is to provide an improved, rapidly-reversedly-moved size-reducing chamber containing a quantity of free moving, size-reducing media and having provision for the conducting thereto during operation of a continuous supply of material to be processed, effective through the improved chamber and feed-supply construction and arrangement to control the entrance of material to the size-reducing chamber by the contents of the latter.

Still a further object of the invention is to provide an improved size-reducing chamber containing a quantity of size-reducing media and having provision for the feed of material thereto during chamber movement, and provided with improved means for effecting processed material discharge so disposed that processed material will be most effectively and rapidly discharged from the chamber through a combination of forces including centrifugal force and the pressure of the chamber contents, and that entering material in large measure shall have to be passed through a stratified mass of grinding media before attainment to the chamber discharge zone.

It is still another object of the invention to provide an improved arcuate, size-reducing chamber having imparted thereto a positive swinging movement and elongated in the direction of its movement and of a comparatively small dimension normal to its path of movement and provided with a charge of freely moving reducing media and effective through the relatively great length of its contents to increase the processing rate, the contribution thereto of attrition, and the control of feed and discharge.

It is yet another object of my invention to provide an improved material-size-reducing mill readily adaptable to single pass reduction, to fine reduction with automatic return of oversize material, or to wet reduction.

It is a further object of the invention to provide an improved processed-material handling apparatus.

It is another object of my invention to provide an improved processed-material handling apparatus cooperating in an improved manner with a size-reducing mill of improved construction.

It is still another object of my invention to provide an improved material-size-reducing mill in which a size-reducing chamber having a feed conduit opening thereinto shall be enabled to effect material-size-reduction not only within such chamber but in the zone of contact between the chamber contents and material in the feed conduit awaiting the opportunity to enter the chamber.

Still another object of my invention is to provide an improved material size-reducing mill having improved feeding means for the material to be processed in which size reduction shall be accomplished at a plurality of points outside the size-reducing chamber proper, with which said mill is provided.

Yet another object is to provide an improved size-reducing mill especially adapted for use with air-classifiers and having improved separate air and material ingress means.

A still further object of my invention is to provide an improved size-reducing mill having an oscillating chamber so constructed as to preclude choking and automatically maintaining, as long as material feed is continued at an adequate rate, optimum size-reducing conditions.

Still another object of the invention is to provide a size-reducing chamber form and a size-reducing medium charge of such a nature and relative quantity with respect to chamber capacity that interruption of feed will reduce power consumption to a minimum, while during normal feed, power losses due to excessive impact will be reduced and maximum size-reduction gained through pressure and internal movement of the chamber contents.

Other objects and advantages of the invention will hereinafter more fully appear.

It will be noted that my invention comprises several aspects. From one of its aspects it comprises an improved size-reducing mill. From another it comprises improved means for returning oversize material for the purpose of securing a further reduction in the size of the same. From a third aspect it comprises an improved size-reducing mill having associated therewith, in a peculiarly advantageous manner, an improved processed-material-conveying and recirculating device. Other aspects will be noted in the course of the ensuing description and from the appended claims.

In a preferred mechanical embodiment of my invention, considering the latter from its size-reducing apparatus aspect per se, there may desirably be employed an arcuate size-reducing chamber to which is imparted pendulum-like movement and whose proportions, speed of movement and range of oscillation and the frequency of whose reversals of movement are determined in accordance with the material to be processed; there being provided within said size-reducing chamber a charge of size-reducing medium appropriate to the material and the desired reducing rate and preferably of a plurality of different sizes, the quantity of such size-reducing medium being desirably so determined that oscillation of the size-reducing chamber, either in the absence of all material to be processed, or with less than a predetermined minimum quantity of material therein in addition to the charge of size-reducing media, shall not be attended by engagement between the extremities of the size-reducing chamber and its contents. In determining the proportions of the size-reducing chamber, the height thereof (radial height), that is the dimension thereof toward the axis of pendulum-like movement, when that axis is horizontal, as is advantageous, will desirably be so selected that the chamber will be substantially constantly filled, in the portions thereof occupied by the chamber contents, by such contents from top to bottom, and whereby automatic limitation of the feeding rate shall be attained through the obstruction by the chamber contents of material seeking entrance through an appropriately located feed conduit means within which there may be maintained at all times a ready column of material awaiting processing.

Through the curved, and desirably arcuate, chamber construction there will be provided an arcuate surface constantly pressed by the moving chamber contents and forming an ever-present and active abutment against which the centrifugal force of the moving chamber contents may expend itself in the reduction in size of the material to be processed, and the reaction upon which of the chamber contents will conserve power. A graduated distribution of the size-reducing media will take place in such a chamber, so that maximum sizes of material shall be subjected to the action of the largest size-reducing media, and while the contained load of material and size-reducing media will be small at any instant, material will be processed and pass through the chamber at a relatively high rate; practically speaking, nearly all the material will pass through the size-reducing medium; and short-circuiting and retention of material will not occur; over-size-reduction will be avoided; and through the automatically, internally regulated feed, minimum total power input and power proportional to the work done will follow. The employment of such a chamber provides a mill small in size, light in weight, low in power consumption, and most efficient in operation.

With a chamber as above described, moved with long stroke, low R. P. M. and high velocity, and providing a continuous arcuate surface struck from the center of oscillation of the chamber, continuously below the media and material to be ground, it is possible to convert a very large percentage of the energy of the load into movement under pressure, to avail of great centrifugal force most effectively, to accomplish size-reduction by attrition to a large degree, and to conserve power most effectively.

In a mill in which the size-reducing chamber is oscillatably supported, has its shape conformed to arcs struck from the center of oscillation, has its feed controlled by the movements of its contents past a feed opening of predetermined width, and is provided with a charge of size-reducing media with which the material to be ground is intermingled during the size-reducing operation—there are a number of variable quantities which enter into the operation of the mill.

In general, it may be said that the harder the material to be processed and the larger the entering pieces of material, the larger the biggest size-reducing media should be.

With central feed of a predetermined width, the potential play of the charge, that is to say, the distance which the load (chamber contents comprising, during processing, material and media) may move within the chamber from its position when compacted in one end of the chamber until it engages the opposite end of the chamber, may be varied by increasing or diminishing the overall length of the chamber. For a chamber having a predetermined stroke (range of oscillation), maximum impact will be attained when the play is made great enough so that the chamber may attain substantially its maximum velocity in one direction before its end is contacted by the forward end of the oppositely moving mass of size-reducing media and material being reduced.

The size-reducing action within the chamber is dependent upon at least three factors: impact, attrition and pressure grinding due to internal movements of the chamber contents, the attrition and the last mentioned factor somewhat overlapping, perhaps, in their classification. Maximum velocity and long play both lend themselves to increasing the amount of size-reduction by attrition and by internal movements in the mass of chamber contents. Increasing chamber length, further, since it increases the chamber contents, enables an increase in processing rate for a given mean velocity of chamber oscillation.

Since at least a minimum impact is essential for any given material to be reduced in size, with greater impact for the harder materials, generally speaking, it is imperative that there shall always be a substantial amount of impact when the entering material is of substantial size, and it will generally be found, it is believed, that the play of the chamber contents in the chamber will best be made sufficient so that the chamber contents shall not impinge against the end of the chamber toward which they are moving, prior to the moment when the chamber becomes stationary preliminary to reversing its direction of movement. For best results, it is further believed that play greater than that just mentioned is desirable, because otherwise the size-reduction through attrition would be relatively slight.

If, in order to attain the maximum processing by attrition, play is to be increased, and since to secure maximum processing by attrition maximum velocity with its attendant maximum centrifugal force are desirable, it will be clear that the chamber should not have passed its moment of maximum velocity in the direction opposite to that in which the charge is freely moving, prior to the instant of contact between the forward end of the moving charge and the approaching chamber end, for otherwise the charge would never attain maximum chamber velocity. We thus have limits established between which normal operations should be conducted for best results. The play should preferably not be so small that the chamber contents overtake the chamber end prior to the moment when the latter reaches its extreme position and it should preferably be considerably greater, but it should not be so great that the chamber will have passed very materially beyond its maximum velocity when it engages the oppositely moving charge. It is to be understood that such limits are not to be considered absolute for all conditions.

For materials relatively easily reduced in size and requiring a relatively low impact to fracture the larger masses, the maximum impact possible with a given chamber velocity is unnecessary, and therefore play may be diminished and impact thereby caused to take place prior to the attainments of maximum velocity by the chamber in a direction opposite to that in which the charge moves. This reduction in play will diminish the quantity of attrition somewhat also, because the length of the relative movement between the charge and the arcuate outer chamber wall will be reduced as impact is reduced. With very hard materials, substantially maximum impact and substantially maximum play will both perhaps be desirable, and the maximum impact will be accompanied, in my design, by maximum play.

By virtue of increasing the chamber length, several benefits may be obtained. The quantity of material that may be processed in a chamber having a given stroke, will be increased. The sharpness of impact, due to the shock absorption throughout the chamber contents, will be reduced. The advantage of increased attrition through centrifugal force can be enhanced due to the greater length of the zone of attrition. Where the curvature is such, due to the increased length of the chamber, that the material moves nearly vertically during the last portions of its movement, some further diminution of the sharpness of impact, with increased attrition, may be obtained. In other words, an increased percentage of total reduction by attrition may be possible.

The presence of the arcuate chamber bottom, constantly engaged by the moving material and presenting a relatively great surface to the moving chamber contents, and against which centrifugal force creates a substantial pressure, markedly increases size-reduction through attrition.

Considered from its aspect as a material transfer device, the invention may desirably comprise an orbitally moving material conveying device providing spaces for the reception of processed material and moving to bring such spaces successively into communication with means for removing from them adequately processed material and with means for receiving from them inadequately processed material not removed by the adequately-processed-material removing means. Desirably, provision is also made for the reception by said transfer device from a classifier connected with the adequately processed material removing means, of any oversize material that may be also removed by such means, and this returned material may be redelivered to the same spaces after they have passed such removing means and be delivered by such spaces to the same or another mill; or said conveying means may advantageously be provided with separate pockets or chambers to which the initial delivery of material to the conveyor may be prevented from having access but to which the returning material from a classifier may be directly delivered for conveyance thereby to the size-reducing apparatus.

When such a transfer device is employed with a size-reducing mill of suitable construction, the transfer device may be arranged to travel around the mill, and to receive its power from the mill drive. It will require no change in rate of drive to accommodate varied mill-chamber stroke, as its capacity will be abundantly great to handle the maximum mill delivery under any conditions.

In the accompanying drawings, in which for purposes of illustration one embodiment which my invention from its apparatus aspects may assume in practice has been shown:

Fig. 3$^a$ is a fragmentary detail on the plane of line 3$^a$—3$^a$ of Fig. 3, showing the circulator drive.

Fig. 4 is a view on a slightly smaller scale than Fig. 2 approximately on the broken section line 4—4 of Fig. 1, certain parts being shown in slightly different positions and others omitted.

The drawings show a mill M having associated therewith and incorporated in the same main casing therewith a material-transfer or elevating device C.

The apparatus shown is supported by a generally rectangular base plate 1 which has adjacent one corner thereof a low pedestal 2, which in turn supports a bearing support 3. Substantially midway between the sides of the bottom plate 1 is a casing 4 providing a chamber 5 in which oscillating mechanism is housed. At the opposite side of the base plate 1 from the pedestal 2, within a large outer casing or shell member 6, the size-reducing mill M and material-transfer and elevating mechanism C are housed. The casing 6 has an inner generally cylindrical wall portion 7 which separates the elevator C and the size-reducing mill M at most points, and provides an inner chamber 8 in which the size-reducing mill is housed. A suitable anti-friction bearing 11 in the bearing support 3 supports one end of a primary drive shaft 12 whose other end is supported in a bearing 13 housed in a removable cover plate 14 supported by the casing 4. The shaft 12 supports between its bearings a driving and energy-storing flywheel and drive pulley 15, which is keyed at 16 to said shaft. The shaft 12 carries a variable-throw crank pin mechanism generally designated 19, and this mechanism is disposed within the chamber 5. The mechanism 19 comprises a circular crank-disc element 20 secured to the shaft 12 and having an eccentrically-formed circular recess 21 in its face away from the member 14. Within the recess 21, a circular plate 22 is mounted, and the plate 22 carries a crank pin 23 in offset relation to its center. The crank pin 23 supports an anti-friction bearing 24 which is housed in the bearing portion 25 of a connecting rod 26 which serves to oscillate the size reducing chamber of the mill M. The plate 22 may be rotated within the recess 21 and held as desired in any one of a series of different positions with respect to the crank-disc element 20, thereby to provide for different eccentricity of the crank pin 23 with respect to the axis of rotation of the shaft 12. The plate 22 at its side opposite the crank pin is made thicker, to act as a counterweight, and the plate has in its thicker portion a series of recesses 27 surrounding openings 28 through which holding bolts or screws 29 may be extended into engagement with appropriate threaded holes 30 in the member 20. The mode of adjustment of the crank-pin-throw will be obvious to those skilled in the art.

The other end of the connecting rod 26 has a bearing portion 35 which surrounds a pin 36 supported in a fork 37 at the outer end of a chamber-oscillating arm 38, which is secured as at 39 to a chamber-oscillating shaft 40. This shaft is supported at opposite sides of the arm 38 in appropriate bearings 41 and 42, the former supported in one wall of the casing 4 and the latter in the boss 43 on the other wall of the casing 4. The shaft 40 at its end remote from the bearing 41 provides a tapered seat portion 45 grooved to receive a heavy key 46 and having at its outer end a threaded portion 47 with which a nut 48 may cooperate in clamping a size-reducing-chamber mounting 49 on the tapered or conical portion 45 of the shaft 40. A suitable dust seal 50, to prevent access of dust to the bearing 42, is carried by the shaft 40 adjacent the base of the conical portion 45.

The size-reducing-chamber mounting 49 may assume, obviously, various forms, but is herein shown as of built-up construction, and includes an inner, conically-bored portion 53 adapted to seat upon the tapered portion 45 of the shaft 40, a spaced, cylindrically-curved wall portion or barrel 54 traversed by mutually opposite openings 55 and 56, a plurality of sets of size-reducing-chamber supporting wings or arms 57, generally radially extending box-like stiffened elements 58 and 59 forming the end walls of a feed connection 60, and mutually opposite end walls 61 and 62 connecting the opposite ends of the cylindrically-curved portion or barrel 54 with the tapering portion 53 and closing the sides of the feed connection 60, in the formation of which they cooperate with the plates 58 and 59. It will be observed that the portions 58 and 59 provide supporting surfaces at 63 and 64 for engagement, as later described, by the size-reducing-chamber member shortly to be described. It will be noted that the openings 55 and 56 are connected by the opposite portions of a generally annular passage 65 surrounding the member 53 and surrounded by the cylindrical wall portion or barrel 54.

The supporting structure just described provides support for and transmits arcuate oscillatory motion to a size-reducing chamber member 70 which forms the walls of a size-reducing chamber 71. The size-reducing chamber member 70 includes an outer perforated, herein shown as slotted, plate 72 bent to conform to the surface of a cylinder whose axis coincides with the axis of the shaft 40 and of an arcuate extent of approximately 180°, an inner plate 73 concylindric with the plate 72 and of generally similar arcuate extent and communicating herein through a series of openings 74 with the delivery end of the material feed passage 60, and parallel lateral walls 75 and 76 connecting the concylindric walls 72 and 73, the wall 76 having an opening 77 therein closed by a suitable cover plate 78. The size-reducing-chamber member also includes chamber-end-forming members 79 and 80, each of semi-cylindrical form and provided with reinforcing ribs 81 and each carrying pads or bosses 82 suitably spaced thereon and provided with projecting studs 83 which are adapted to extend through openings 84 formed in heads 85 carried at the outer ends of the wings 57 of the size-reducing chamber support structure; and nuts 86 cooperate with the studs 83 to clamp the chamber in position. The chamber end portions 79 and 80, whose inner surfaces 87 are semi-circular in cross section, are made of heavier material than is necessary for the other walls of the chamber, and it will be understood that the shape of these end members may be varied as desired, depending upon the results sought. For the particular mill construction illustrated, rounding of the chamber ends is desirable as it reduces the tendency of material to lodge in corners, as might occur were sharp angles formed at the extremities of the chamber and were material at all sticky in consistency to be processed therein. Due to the rounding there is a slight tendency of the size-reducing chamber contents to rearrangement at the ends of the moving mass as the contents engage the chamber ends, but this is not prejudicial.

The chamber-forming member 70 is readily removable from its supporting structure simply by removing the nuts 86; and it is held in position upon its support with the portions thereof adjacent the ends of the openings 74 and at the outer sides of these openings engaging the supporting surfaces 63, 64 carried by the chamber supporting structure and the outer ends of the members 61, 62. The construction of the parts is such that the chamber is held in position and pressed against the surfaces 63, 64, etc., by the tensioning of the studs 83. The chamber bottom 72 may be provided with discharge openings 88 of any desired form, and the number and the individual shapes and areas of these discharge openings may be varied with the material to be processed, the desired processing rate, etc. The openings are made small enough to preclude the passage through them of the size-reducing media employed within the chamber. It is not necessary to make the openings so small as to serve as a screen precluding the leaving of the chamber by particles in excess of the desired finished-product-size, except in cases where single-pass size-reduction is the process used, for with recirculation of the material with the aid of a suitable classifier the repeated passing of oversize material through the mill will result in ultimate reduction to the desired maximum size.

Within the size-reducing chamber is provided a charge 89 of size-reducing media (e. g., a ball-charge) whose constitution will vary with the material to be processed. For reduction of material to the finer sizes, a charge composed of various sizes of grinding media may desirably be used.

Within the inner chamber 8 there is secured a structure 90 for the delivery of material to be processed to the mill, for the admission of air to the mill when desired, for conducting back material to be further reduced in size to the mill, and for aiding in the establishment of a flow of air for conducting material to a classifier or point of use. The structure 90 is secured as at 91, 92 to the side walls of the casing 6, and its innermost portion is supported as at 93 upon the boss 43 and provides, as it were, a saddle 94 to seat upon and provide a seal with the uppermost portion of the moving, cylindrically-curved member or barrel 54. The interior of the structure 90 is nearly completely divided by a partition 96 into a material feed chute 97 and another chamber 98 whose function will be shortly more fully described. The chute 97 has feed openings 99 communicating therewith at each side of the casing 6. In like manner the chamber 98 has openings 100 communicating therewith and extending through each side of the casing 6. Obviously, the feed to the chute 97 may be effected through either or both openings 99, and air may be admitted to the chamber 98 through either or both openings 100. A supply connection device 101, suitably partitioned as at 102 to separate an initial material delivery passage 103 from an initial air delivery passage 104, is secured to one side of the casing 6; and the air supply may be controlled by varying the suction under which the chamber 98 is placed, as by controlling the speed of an exhaust fan, or by an appropriate shutter 105 adjustably supported to slide across the mouth of the space 104, or in various other ways. The inactive opening 99 will ordinarily be suitably closed, but an adjustable shutter 105' may be provided for the other opening 100 when a second device 101 is not used.

The top wall of the chamber 98, which is formed by a portion of the cylindrical wall 7, is perforated as at 106 to permit the passage of jets of air therethrough, and an opening 107 communicating with the chute 97 is also formed in the cylindrical wall 7 opposite the outer end of the chute 97. A suitable slot 108 conects the chamber 98 with the supply passage or chute 97; and the supply passage 97 communicates through an opening 109 in the saddle and the opening 55 with the interior of the barrel or cylinder-like member 54.

The cylindrical wall 7 is provided in its lower portion with a plurality, herein a pair of elongated slots 110 separated by an imperforate strip 111, whose purpose will shortly be apparent. The outer wall of the casing 6 at the bottom is provided with an opening 112 which communicates with a space 113 formed in a depending portion 114 secured to the casing 6. An opening 115, sealed in the specific arrangement shown in the drawings by a plate 116, may be used for the discharge of material from the space 113 if desired.

It will be noted that material to be processed delivered through the opening 103 may pass through the opening 99 into the chute 97, through the opening 109 in the saddle, through the opening 55 in the barrel, through the annular passage 65 and opening 56, into the feed delivery space 60, into the chamber 71, through the openings 88, after processing, through the slots 110, through the space between the wall 7 and the outer wall of the casing 6, through the opening 112, into the space 113, and, if the plate 116 is removed, through the opening 115 to a point of use. Such would be the course of material in single-pass, dry size-reduction, or in wet-process size-reduction.

The casing 6 is provided with a large hinged cover 117 permitting access to the chamber 8.

As pointed out above, material may pass through the chamber 71 without being completely reduced to the desired ultimate size, and to effect, where a very finely reduced material is desired, a delivery of the material to a classifier for the return therefrom of insufficiently size-reduced material, and also to effect a direct return of a portion at least of the insufficiently reduced material to the size-reducing chamber, I have provided the material-moving arrangement C. This comprises, in the illustrative embodiment shown, an annular conveyor 120 rotating on an axis extending through its centre and driven from the drive shaft 12. The conveyor comprises a pair of lateral, annular, toothed members 121 and 122, from each of which there extends toward the other a series of material-moving elements 123 whose adjacent ends are connected to the relatively closely spaced, lateral walls 124 of a series of pockets 125 which are separated from each other by partitions 126. The members 123 have arcuate pockets or spaces 127 between them, with which, as the conveyor 120 travels about its axis, the slots 110 successively communicate. The strip 111 seals the pockets 125, however, from communication with the slots 110; and the pockets 125 and spaces 127, since they each are open both at their inner and outer portions, are adapted to permit the passage of material radially therethrough, at such times as their inner or outer ends are not closed by cooperating stationary walls of the casing member. The perforations 106 leading from the space 98 do not extend through the wall 7 in the zone of the latter which is traversed by the pockets 125. The opening 107 is, however, of such a lateral extent that it communicates both with the pockets 125 and the spaces 127. Conveyor 120 is coaxial with shaft 40.

Drive of the conveyor 120 is effected by pinions 130, 131 carried by a shaft 132 and meshing with the annular gears 121 and 122, respectivly. The shaft 132 is journaled suitably as at 133, 134 in the walls of the casings 6 and 4, and is provided with a fork 135 into whose slot 136 a reduced extension 137 of the crank pin 23 extends. Obviously, in view of the construction described, a varied throw of the crank pin may be effected without interrupting the drive of the shaft 132 or changing the rate of rotation of the latter.

Figure 1:
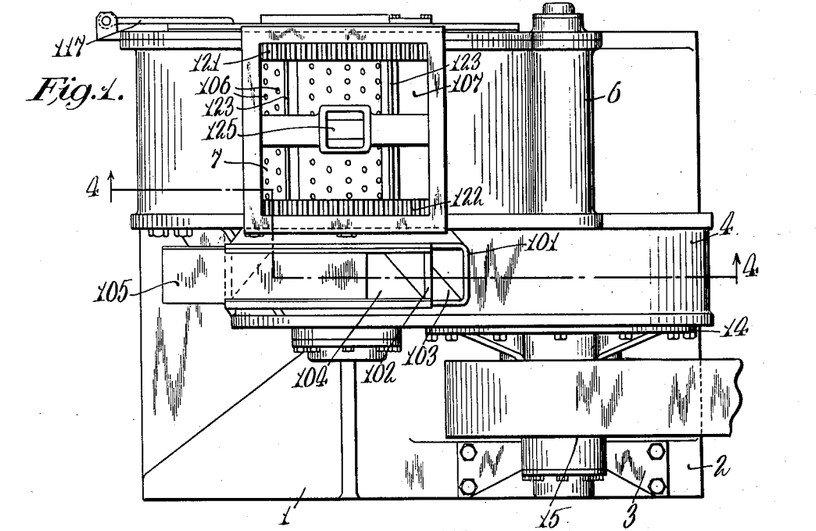
Fig. 1 is a top plan view of a size reducing mill having associated therewith means for moving the material which has passed through the mill.
Figure 2:
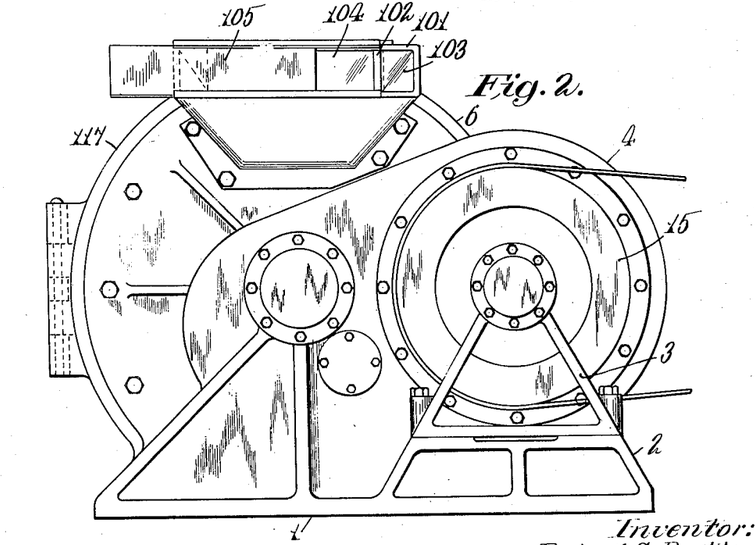
Fig. 2 is a side elevation of the apparatus of Fig. 1.
Figure 3:
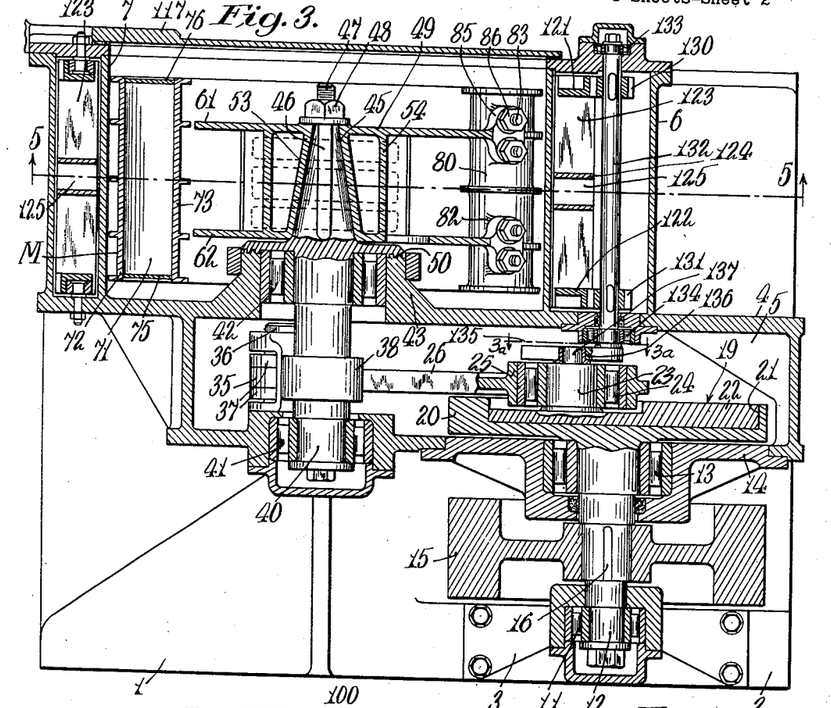
Fig. 3 is an enlarged horizontal section on a plane corresponding generally to the line 3—3 of Fig. 4.
Figures 3A, 4:
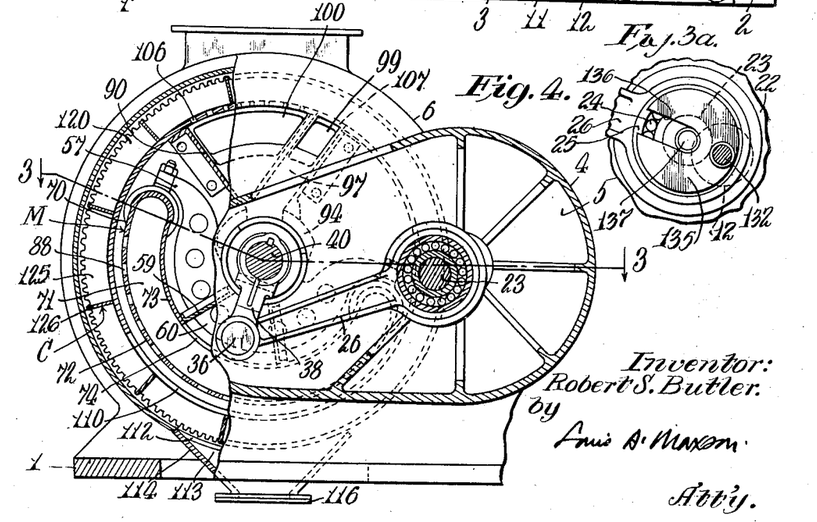
Figure 5:
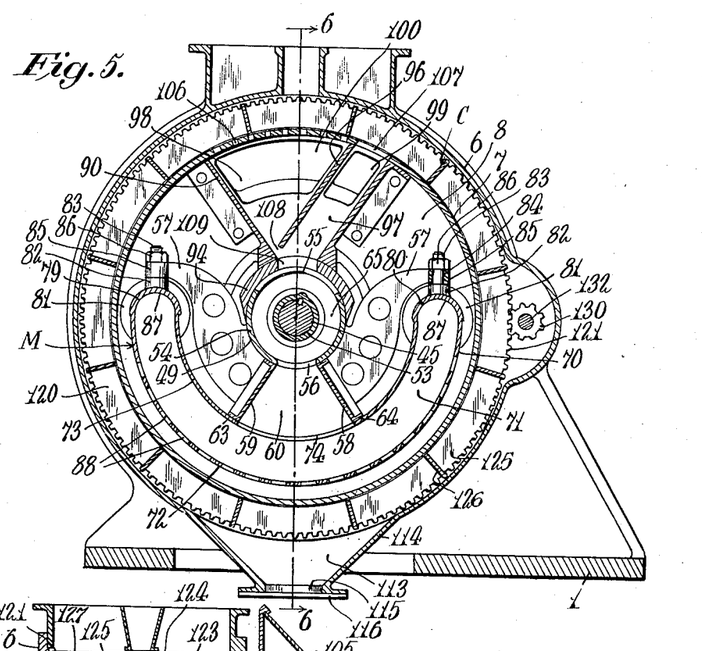
Fig. 5 is a vertical section on the plane corresponding to the line 5—5 of Fig. 3, with parts in different positions.
Figure 6:
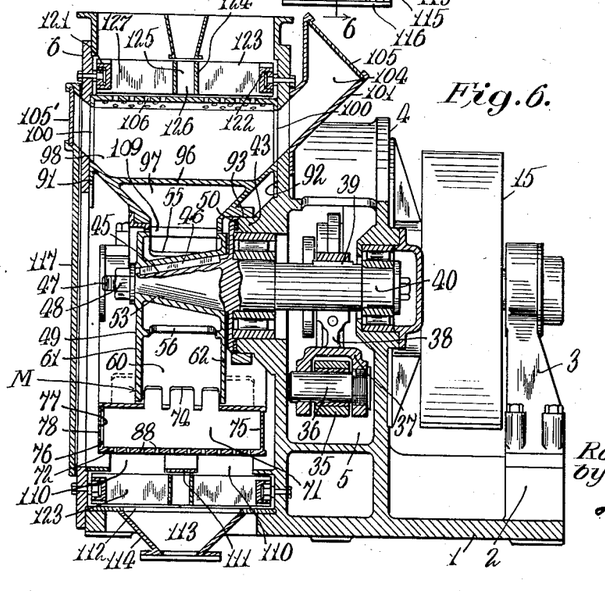
Fig. 6 is a vertical transverse section on the plane corresponding to the line 6—6 of Fig. 5.
Figure 7:
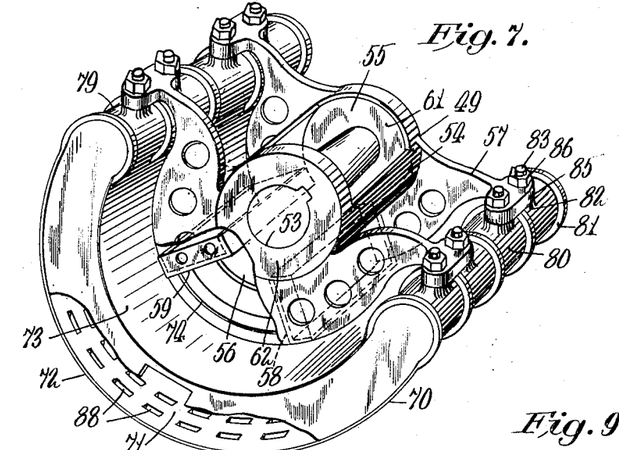
Fig. 7 is a perspective view, with parts broken away, of a size-reducing chamber and its supporting mechanism.
Figure 8:
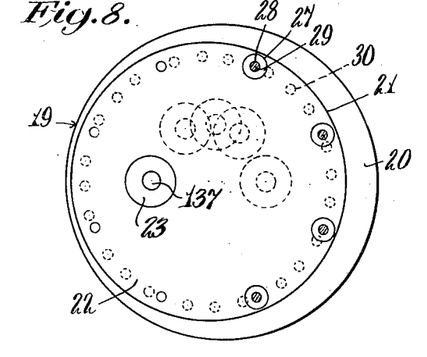
Fig. 8 is a somewhat diagrammatic view of the stroke-varying means.
Figure 9:
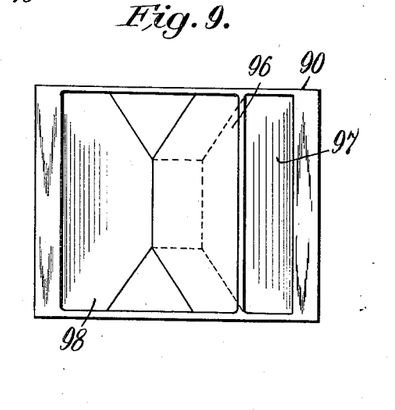
Fig. 9 is a plan view of a portion of the air and material supply means.
Figure 10:
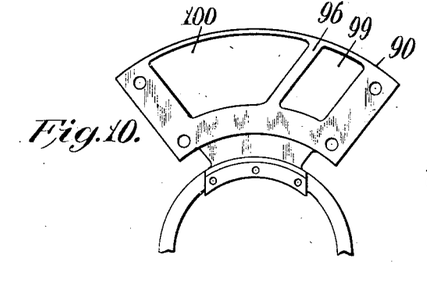
Fig. 10 is a detail view in side elevation showing a portion of the material and air supply means.
Figure 11:
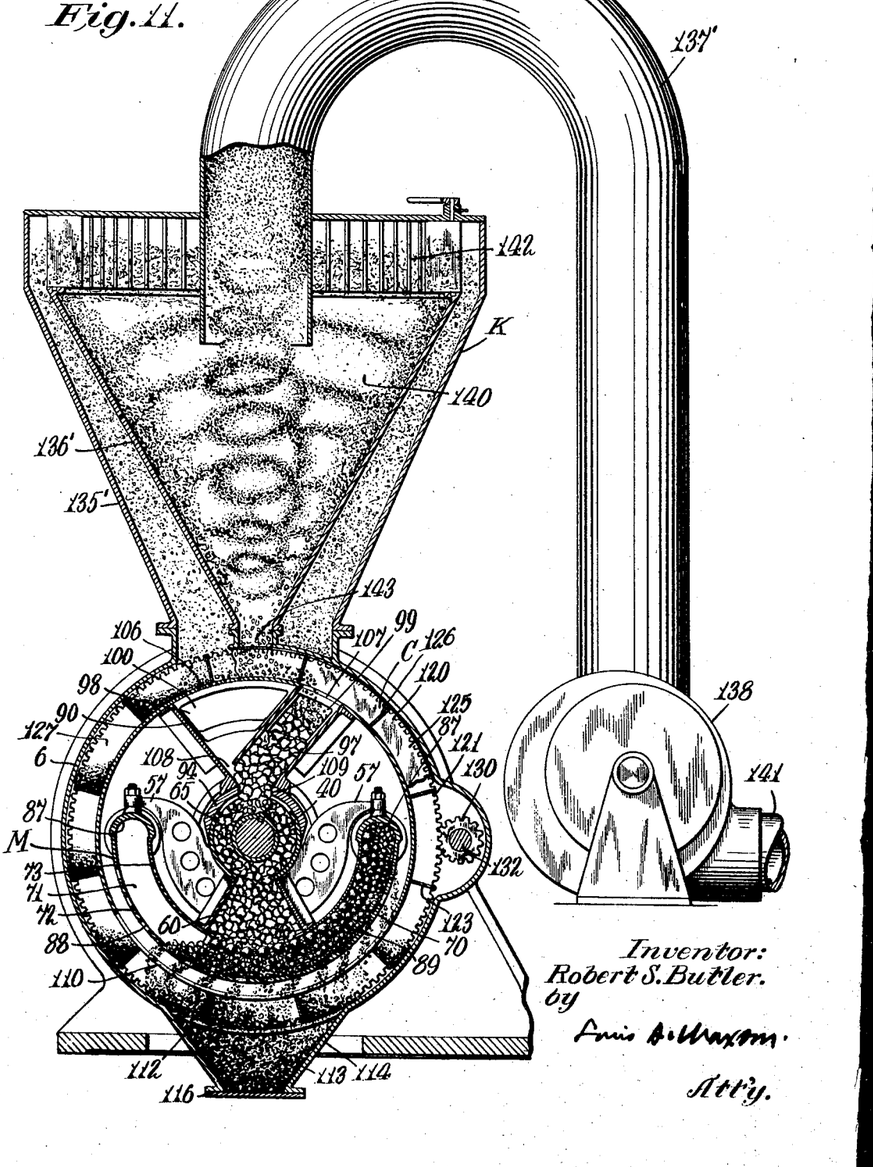
Fig. 11 is a view in central vertical section on a plane corresponding to the section of Fig. 5 through a mill with a classifier mounted thereon and with processed-material delivery devices shown in one illustrated form, a portion of the section being broken back to a parallel plane for better detailed disclosure.

In Fig. 11 the apparatus of the previous figures is shown equipped for direct supply of its finished product to a powdered-coal burning device. A classifier K is mounted upon the top of the casing 6, and this classifier comprises conical outer and inner shell members 135' and 136', the outer one of which tapers at a less rapid rate so that the passage, annular in cross section, provided between the elements 135' and 136', may maintain an appropriate velocity of the air therein. A pipe or conduit 137' is connected at one end to an exhaust fan 138, and at its intake end extends into the inner chamber 140 of the classifier. The exhaust fan 138, through a conduit 141, delivers air and coal dust in suspension to one or more burners (not shown). A series of adjustable vanes 142 is provided at the top of the inner classifier chamber wall 136' for the purpose of imparting a whirling motion to the air and suspended material as they enter the chamber 140. Accordingly, there is a centrifugal action set up in the chamber 140, the heavier particles (insufficiently reduced in size) traveling completely to the wall of the chamber and traveling down the latter, while the adequately processed material remains in suspension and is drawn out through the conduit 137'. The heavier particles, on reaching the bottom of the inner cone 136', enter a delivery passage 143 which is arranged in alinement with the pockets 125 in the orbitally moving conveyor element 120.

The mode of operation of the apparatus described will be readily understood from the foregoing description.

Upon the starting of the driving motor (not shown), the flywheel and driving pulley 15 will cause the shaft 12 to rotate, and the chamber-forming member 70 will thereby be set in oscillatory motion and the conveyor device 120 will be caused to move in its circular orbit. In Fig. 11, the direction of travel of the circulator is clockwise. As soon as the mill is in motion, feed will begin, and in the construction shown, material supplied to the passage 103 will enter the chute 97 through the opening 99 and pass through the opening 109 in the saddle, through the opening 55 in the barrel, through the annular passages 65, through the opening 56 into the conduit 60, through the openings 74 into the size-reducing chamber 71; and will there mingle with the size-reducing media 89. When the chamber is oscillated in the absence of feed, and until sufficient feed has occurred to bring the volume of the chamber contents up sufficiently to cause engagement thereof by the end walls of the chamber, the lower wall 72 of the chamber will pass back and forth beneath the charge of size-reducing media and any inadequate quantity of material which may be within the chamber, without imparting thereto sufficient movement to cause contacts with the ends of the chamber, and thereby a minimum amount of power will be required.

As the quantity of material entering the chamber builds up the chamber contents sufficiently so that the load within the chamber will be engaged by a chamber end, active size-reduction will commence. The load will now begin to undergo an amplified movement, since to the friction of the bottom of the chamber will be added the positive pushes of the ends of the chamber, and the chamber contents or load will take up a cycle of movement within the chamber which will comprise periods of deriving motion from the chamber, periods of travel in the same direction with the chamber but at a rate exceeding the decelerating velocity of the chamber, periods of further travel in the original direction while the chamber is building up a reverse velocity, and periods of engagement with the chamber end, of internal movement, compacting, etc. The third period may be wholly absent under some circumstances, and may be of varied duration, depending upon the play of the contents within the chamber. The phenomena described will occur twice in each complete rotation of the drive shaft 12.

As soon as the cycle described gets under way, the chamber contents will become nearly constant in volume. The chamber contents will be equal substantially to the volume necessary to fill, when said contents are compacted, the space opposite the mouth of the feed passage 60 and the space between the extremities of the openings 74 and one end of the chamber. The chamber contents will regulate the feed, because material from the feed passage will be able to enter the chamber in substantial quantity in but two ways: by the sifting in or infiltration, so to speak, of the smaller material into the spaces in the uppermost tier of the load, and by the influx of a quantity of material past the ends of the load each time the latter is compacted in a chamber end. The load, after its motion has been well established, will assume, as it were, a stratified condition, with larger size-reducing media at the top, intermediate sizes of size-reducing media in the middle course of the chamber, and the smallest size-reducing media adjacent the lower arcuate wall 72 of the chamber. The material will in a similar manner be stratified, wtih the larger-sized pieces generally near the top of the charge. The material, as size-reduction takes place, will progress downwardly through the media, and similar charges of material and media will be found more or less together throughout the charge, subject to the exception that the smallest sizes of material will be smaller than the smallest size-reducing media ordinarily, and that fine material will sift through the interstices between the media and material particles of the different strata.

As the chamber oscillates, its contents will pass alternately from end to end of the chamber. During their period of bodily movement relative to the chamber, the contents will press, under the action of centrifugal force, against the bottom of the chamber provided by the wall 72, which will constitute an abutment against which the chamber load will act. Because of the unequal distances from the center of oscillation, there will be substantial size-reducing action within the mass, added to the pressure size-reduction, arising from the centrifugal force, and the large amount of attrition which likewise grows out of the centrifugal force. At the ends of the chamber there will be size-reduction due to impact, particularly of the larger material pieces which enter through the openings 74 past the ends of the compacted load. There will be size-reduction through internal action of the mass due to the consolidation of the load as its motion is first checked and then reversed at the chamber ends. The size-reduction due to impact will be less than would be the case were a smaller mass of equal weight suddenly checked and reversed, but due to the packing of the relatively loose, free-traveling, long mass of chamber contents, there will be a highly effective size-reducing action not only at the head of the moving load but throughout its whole length.

It will be noted that size-reduction occurs at the bottom wall of the chamber, at the ends of the chamber, and throughout the mass of material and media within the chamber; and it may also be noted that there will be size-reduction at the zone of contact between the chamber contents and the material filling the feed passage. As the load passes back and forth between the ends of the chamber, its upper surface—which is the roughest due to the larger balls or other media and larger pieces of material being at the top—passes back and forth beneath the column of material in the feed passage, seeking entrance to the chamber, and abrades the lower surface of this material. Even above this zone of very active size-reduction, there is further size-reduction taking place, for the plates 58, 59 that form the end surfaces of the feed passage act as abutments, and the material in the feed passage is alternately crowded hard against these plates and against itself as reversals of chamber movement occur; and there is, moreover, some size-reduction at the edges of the opening 55 as these move relative to the stationary edges of the opening 109 as the barrel oscillates.

As the material reduced in size sufficiently to pass through the openings 88 reaches the latter, it passes out therethrough and then passes through the elongated openings 110, 110 into the annular chamber in which the conveyor travels. Here it will be noted that the material will first fill up the space 113 and then, as further material enters the different spaces 127 in the conveyor 120 and is prevented from passing downwardly by the chamber wall and by the material standing in the space 113, it will be moved along in the spaces 127 as the conveyor moves in its orbit. It will be noted that material begins to enter each space as it first moves out into communication with the end of the openings 110; further material enters the spaces 127 as they travel beneath the openings 110; and the entering of material into these spaces does not end until their rear edges pass beyond the further end of the openings 110. The material entering these spaces is normally in part fully reduced to the desired finished size and in part over-size. It should be observed here that no material enters the pockets 125 because these are covered by the strip 111 separating the slots 110. When the spaces 127 containing material which has passed through the chamber, reach the perforations 106, the material in these spaces will be subjected to jets of air passing through the openings, and all but the heaviest particles of the material will be blown upwardly into the space between the walls 135' and 136' of the classifier K. The material will be carried upwardly in Fig. 11 by the suction caused by the fan 138 which is connected by the conduit 137' with the inner chamber 140 of the classifier and which is adapted to deliver, to a point of use, through the conduit 141, the fully processed material. The classifier vanes 142 impart to the material and air currents delivered from the annular chamber between the walls 135' and 136' into the chamber 140, a whirling motion, and accordingly centrifugal force will move to the outer portion of the chamber 140 the heavier particles, while the lighter particles remaining in suspension will be drawn out through the conduit 137'. The heavier particles, traveling back down along the inside of the wall 136', will enter a passage 143 which is alined with the pockets 125 in the conveyor, and these pockets receive the over-size material and, as the conveyor continues to move in its orbit, deliver these particles through the opening 107 into the feed chute 97, whereby these over-size particles are returned to the size-reducing chamber. The heavier particles of material not removed from the spaces 127 likewise, when these spaces pass over the opening 107, are returned to the feed chute 97, and thus re-enter the mill. Accordingly, both the spaces 127 and the pockets 125, upon passing beyond the opening 107, are in a substantially empty condition.

If the feed be interrupted or reduced below the mill capacity at any time while the mill is in operation, the size-reducing chamber 71 will soon substantially empty itself of the material therein and, the quantity of size-reducing media being insufficient to maintain contacts with the chamber extremities, the power consumption will be much reduced until a renewed influx of material again builds up the volume of chamber contents sufficiently to effect a return to the normal reducing cycle.

For the purpose of illustrating more in detail certain of the phenomena which occur during the operation of the mill, Figs. 12 to 15 may be noted.

Figure 12:
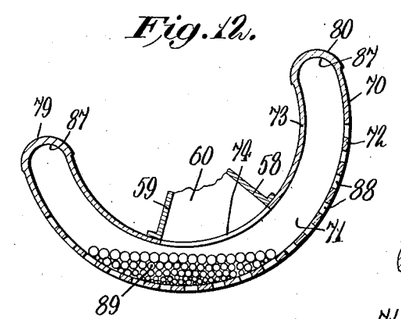
Figs. 12 to 15, inclusive, are diagrammatic fragmentary views showing the size-reducing chamber and its contents in different positions, to illustrate somewhat ideally the phenomena which occur therein.

In Fig. 12 the size-reducing chamber 71 is shown as containing only the charge of size-reducing media 89. The chamber in this view is in motion and is at one of its extremes of movement, but it will be observed that the charge of size-reducing media does not contact with either end of the chamber. The inertia of the media mass is so great and the forces imparted thereto solely by the friction thereof on the bottom wall of the chamber are so relatively small, that no movement sufficient to cause or to maintain contacts with the ends of the size-reducing chamber is acquired by the size-reducing media.

Figure 13:
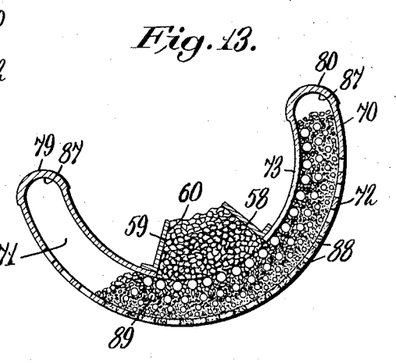
Figure 14:
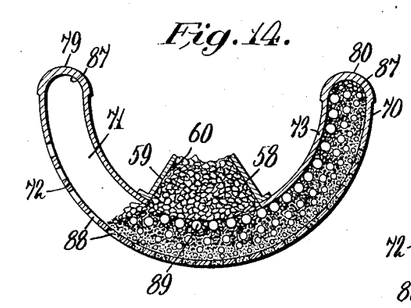
Figure 15:
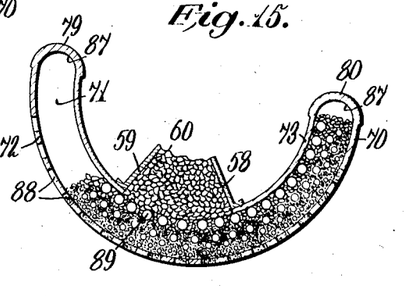

Figs. 13, 14 and 15 show the chamber and its contents in three different positions. In these figures, the chamber contents include not only the size-reducing media, but also material in process. Fig. 13 shows the chamber 71 at one of its extreme positions of travel, and it will be observed that the chamber contents are still moving toward the right in this figure and have not yet contacted with and compacted themselves in the right-hand end of the chamber, although the latter has reached its extreme right-hand position, in this position of the chamber; and in cases where a very low amount of impact is needed and a short play will suffice, they may actually attain their full right-hand position, in the position of the chamber which is shown in Fig. 13. The chamber in Fig. 14 is moving from right to left and has attained approximately mid-position in that direction of movement. The chamber contents are still compacted in the right-hand end of the chamber, as up to the instant represented, they have been undergoing acceleration, and accordingly their inertia has maintained them compacted in the right-hand end of the chamber whose walls have been transmitting the accelerating force to the chamber contents. This figure shows feed taking place through the left-hand extremities of the passages 74. At this moment, since the velocity of the chamber is a maximum, the feeding pressure is at a maximum, though feeding has been possible and has been taking place for a material portion of the travel of the chamber between its extreme right-hand position and the position shown in Fig. 14. In the position of the parts shown in Fig. 14, the chamber contents and the chamber member possess substantially identical velocities, and accordingly, as the chamber commences to slow down, due to the characteristics of its driving mechanism, the chamber contents, which will decelerate less rapidly than the chamber walls, will move ahead relative to the chamber and will occupy, prior to reaching a position at the opposite end of the chamber, among others, the relative position shown in Fig. 15. Here it will be noted that the chamber contents at their forward end have passed beyond the ends of the passages 74, and that the rearward end of the chamber contents mass is moving away from the then-rearward end of the chamber, while the forward face of the moving contents mass is reducing its distance from the left-hand end of the chamber, which is still, however, moving toward the left. Obviously, in the relative position of Fig. 15, feed through the feed passage 60 is cut off except to such an extent as is possible due to the sifting of finer particles of material into the interstices between the larger uppermost material fragments and size-reducing media at the top of the moving mass of chamber contents.

It is important to note in Figs. 11, 13, 14 and 15, the classification of the chamber contents, while Fig. 12 specifically shows the "no-load" characteristic of the invention.

From the foregoing description it will be evident that I have provided an improved size-reducing apparatus of simple construction and great efficiency; that it combines attrition, pressure size-reduction, and impact size-reduction in a most efficient way; that it carries on the process of size-reduction not only in the chamber 71, but also before the material reaches the chamber proper; that when used for the reduction of material to small size, it does not over-reduce the size of the material, but instead recirculates oversize particles and reduces them to the desired "mesh" upon a successive passage through the chamber; that it controls the feed automatically by the conditions in the chamber and thereby maintains the most effective possible control of the feed; that it automatically reduces the power consumption whenever feed is discontinued, and that it is simple, easy of access to working parts, relatively of low first cost and upkeep, very rugged, and efficient.

In the foregoing description reference was made to the possibility of wet-milling. Under such circumstances, of course, it would be unnecessary to use a circulator or conveying apparatus of the type shown, and the material in the form in which it leaves the chamber could be allowed to pass through the openings 110 into the space 113 and be conducted away through the opening 115, through any suitable delivery connections.

It has further been pointed out that where a mere granular product is desired, and single-pass size-reduction will suffice, neither classifier nor circulator is necessary; and by making the discharge openings 88 from the chamber 71 of the proper size, a product of the desired fineness may be secured by a single pass of the material through the chamber.

My invention may be adapted to the processing of substantially any material requiring size-reduction, provided the initial size of the entering material is not excessively large. The mill illustrated is particularly adapted for the pulverization of coal, to prepare the same for burning directly as it ultimately leaves the size-reducing and classifying system. The invention may, however, be incorporated in equipment for handling virtually any material, and it has particular advantage in its application to ore-grinding, in that there is no tendency to retention of values in the machine, and instead there is a uniform discharge of values as produced. Accordingly, there is no delay in securing the values; and since the discharging material represents at any instant the value at that time of the material being processed, it is possible to judge the economy of the milling operation at any time.

In the illustrative apparatus disclosed, a classifier is shown as mounted directly upon the milling and circulating unit. Obviously, the milling unit may be used without the circulating device, and material discharged through the opening 113 may be delivered to an entirely separate classifier, and the over-size material may be either returned to the mill from the separate classifier for further size-reduction or further reduced in size in an entirely separate mill.

An arcuate chamber shape has been illustrated. As indicated above, however, a true conformation to the arc of a circle is not imperative. If the chamber be provided with a curvature on diminishing radii from its central point towards each end, many of the advantages of the present device will be obtained and possibly some of the advantages may be intensified. It is, therefore, to be understood that, except as specifically limited in the claims, my invention is not to be construed as limited to any precise chamber curvature.

This application is a continuation in part of my application Serial No. 759,902, filed December 31, 1934. There have been filed continuations in part of this application—to wit: Serial No. 45,796 and Ser. No. 45,797 in which respectively the broader apparatus aspect and the method aspect of this application are disclosed and claimed, and there is intended to be claimed in this case only subject matter not disclosed and claimed in said continuation in part applications.

While I have in this application specifically described one form which my invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In combination, in a mill, an oscillating structure providing a size-reducing chamber spaced from the axis of oscillation of said structure, a hollow portion surrounding the axis of oscillation of said structure and providing a sealing surface struck from said axis of oscillation and traversed by an inlet opening, and a feed passage extending from the interior of said hollow portion to said chamber, a stationary saddle element having a supply passage therein communicating continuously with said inlet opening and surrounded by surfaces conforming to said sealing surface and coacting with the latter in the prevention of the escape of material, and means providing delivery passages respectively for new material to be reduced in size and for material to be re-milled communicating with the supply passage in said saddle element.

2. In combination, in a mill, a stationary feed connection, an oscillatory milling chamber wholly laterally offset from said feed connections and having means providing a feed passage continuously in communication therewith and with said feed connection, said stationary feed connection and said feed-passage-providing means having concentrically formed surfaces between which relative movement takes place during chamber oscillation coacting to preclude material escape and which surfaces are provided with constantly communicating openings for maintaining the continuous communication specified, and respectively lateral and top openings into said feed connection for material admission thereto.

3. In combination, an oscillatory milling chamber having a feed neck swinging therewith and extending to said chamber from adjacent the axis of pivoting of said chamber, a stationary saddle having a feed opening constantly in communication with said feed neck and coacting with the latter to preclude material escape, and said chamber having, further, means for discharging material from its interior during chamber oscillation, means for subjecting said chamber discharge means to suction during the size-reducing operation, and air and material supply connections communicating with the feed opening in said saddle and arranged above the same.

4. In a size-reducing apparatus, an oscillatory size-reducing chamber member having means for discharging material therefrom during oscillation thereof, a unidirectionally moving circulator member positioned to receive chamber discharge and raise it to a point above said chamber, means for removing adequately reduced material from said circulator, means for returning to said size-reducing chamber material within said circulator after removal of such reduced material a common driving shaft for said members, and operative driving connections between said shaft and said members for oscillating said first named member and unidirectionally rotating the second and including means adjustable to provide for different arcs of oscillation of said chamber while the speed of circulation of said circulator is maintained constant.

5. In an apparatus of the character described, in combination, a mill, a classifier, a series of orbitally-moving pockets receiving the discharge from the mill and moving it to adjacency to the classifier, means for effecting delivering of substantially size-reduced material from said pockets to the classifier, means for returning to the mill material not removed from said pockets, and means for returning inadequately size-reduced material from the classifier to the mill.

6. In an apparatus of the character described, in combination, a mill, a classifier, a series of orbitally-moving pockets receiving the discharge from the mill and moving it to adjacency to the classifier, means for effecting delivering of substantially size-reduced material from said pockets to the classifier, means for returning to the mill material not removed from said pockets, and means including a second series of orbitally-moving pockets also arranged for coacting with said return means to said mill for receiving from the classifier and returning inadequately size-reduced material from the classifier to the mill.

7. In an apparatus of the character described, a conveyor comprising a plurality of elements cooperating to form a plurality of series of pockets all traversing at like rates like orbits, each series extending in the direction of movement of the conveyor, a mill, means for delivering from said mill processed material to the pockets of at least one series, a classifier, means for effecting a discharge of adequately processed material from such pockets to said classifier, means for delivering any incompletely processed material from said classifier to the pockets of another series, and means for returning from both series of pockets incompletely processed material to said mill.

8. A mill having a primary intake through which material to be processed is admitted, said mill having a discharge, an orbitally moving conveyor associated with said mill and receiving material from said mill discharge, said conveyor providing a plurality of pockets to which discharged material is delivered by said mill discharge and also a plurality of pockets at all times shielded from the delivery of such material to them by said mill discharge, means for removing adequately reduced material from the first mentioned pockets, means for returning to the primary intake inadequately reduced material from said first mentioned pockets, means for delivering to said second mentioned pockets inadequately reduced mterial previously taken from said first mentioned pockets, and means for returning to the mill from said second mentioned pockets such inadequately reduced material.

9. A circulator for a mill with which a classifier is associated, said circulator providing a series of pockets for freshly processed material and a series of pockets for material returned from a classifier, said pockets moving together through the path of said circulator, means for precluding entry at any time of either material into the series of pockets provided for the other material while permitting access of each material to its own series of pockets, means for placing the first series of pockets successively in communication with a classifier and with the intake of the associated mill and for effecting delivery of material to the classifier while said first mentioned communication is occurring, and means for bringing the pockets of the second series successively into communication with a return from the classifier and the mill intake.

10. In a grinding mill, a casing providing a substantially cylindrical chamber, a substantially concylindric chamber-forming member within said casing, within which there is an inner chamber and which coacts with said casing to bound an annular space, a circulator traversing the annular space between said casing and member, a mill in said inner chamber discharging through the peripheral wall thereof to said annular space, material egress and ingress means for said annular space, and an opening to said mill from said annular space overrun by said circulator.

11. In a grinding mill, a casing having a substantially cylindrical wall, a substantially concylindric wall within said first mentioned wall cooperating with the latter to form a generally annular space, a circulator traversing the annular space between said walls, a mill within the space surrounded by said inner wall and discharging through the lower portion of the latter to said annular space, material egress and ingress means communicating with said annular space adjacent the uppermost portions thereof, an opening to said mill from said annular space overrun by said circulator, and another opening to said mill to the inside of said inner wall.

12. In an apparatus of the character described, a housing providing a passage between substantially concentric walls, a circulator moving orbitally in said passage, means for creating a differential in pressure between a space within the inner wall and above the outer wall near the top of said housing whereby a draft normal to the travel of the circulator is produced for removing material carried upward thereby, a return passage for material not carried away by the draft traversed by said circulator, and a size-reducing mill arranged within the orbit of the circulator, means for delivering material from said mill to the circulator near the bottom of the orbit of the latter, means for receiving material from said return passage and delivering it to said mill, and means for supplying fresh material to said mill.

13. In combination, a mill having a primary intake through which material to be processed is admitted, said mill also having a discharge, an orbitally moving conveyor associated with said mill and surrounding the latter and receiving material from said mill discharge, said conveyor providing a plurality of pockets to which discharged material is delivered and also a plurality of pockets at all times shielded from the delivery of such material, means for removing adequately reduced material from the first mentioned pockets, means for returning to the primary intake inadequately reduced material from said first mentioned pockets, means for classifying the material removed from the first mentioned pockets, means for delivering to said second mentioned pockets inadequately reduced material previously taken from said first mentioned pockets, and means for returning to the mill from said second mentioned pockets such inadequately reduced material.

14. In an apparatus of the character described, a conveyor traversing a closed orbit and having extended around its periphery a plurality of mutually-laterally-offset series of pockets moving in spaced paths, a mill, means for delivering from said mill processed material to the pockets of at least one series, means for removing from such pockets all but materially under-processed material, means for classifying the removed material, means for returning under-processed material from said classifying means to pockets of another of said series, means for returning residual material in said first mentioned pockets and under-processed material returned to said second mentioned pockets to said mill, and means for introducing fresh material into said mill while the latter is in operation.

15. In an apparatus of the character described, a conveyor traversing a closed orbit and having extended around its periphery a plurality of mutually-laterally-offset series of pockets, a mill, means for delivering from said mill processed material to the pockets of at least one series, means for creating a fluid current for removing from such pockets all but materially under-processed material means for subjecting to a classifying action the removed material while in suspension in said fluid, means for returning under-processed material from said classifying means to the pockets of another of said series, means for returning residual material in said first mentioned pockets and under-processed material returned to said second mentioned pockets to said mill, and means for introducing fresh material and a fluid for the flotation of processed material into said mill while the latter is in operation.

16. In combination, an oscillating grinding chamber support providing means forming the walls of a feed passage extending radially from the axis of oscillation of said support and terminating in a surface surrounding a feed passage mouth and adapted to provide an abutment for sealing engagement with a grinding chamber and, at opposite sides of said feed-passage-wall-forming means, supports for the extremities of a grinding chamber, and an arcuate grinding chamber clamped to said last mentioned supports and drawn solely by such clamping against such surface.

17. In combination, a pivotally supported barrel member traversed by a material-supply passage and having a pair of arms whose more remote extremities lie at opposite sides thereof and further having midway of the arc between said arms a feed passage communicating with the interior of said barrel member, and an elongated, semi-annular size-reducing chamber having a feed opening communicating with said feed passage and having clamping means only at its opposite ends for holding the same to said arms with said feed opening in sealed communication with said feed passage.

18. In an apparatus of the character described, an oscillating mill having a discharge, a conveyor surrounding said mill and receiving the discharge from the same and moving in a circular orbit struck from a center in the axis of oscillation of the mill and delivering material received from said mill to a discharge for the fully reduced material at a point above the bottom of the mill, means for removing fully reduced material from said conveyor including means for creating a fluid pressure differential between opposite sides of said conveyor at the point of discharge, and alined drive shafts for conveyor and mill.

19. In an apparatus of the character described, a pivotally mounted support including an abutment portion and support portions at the opposite sides of said abutment portion, means for oscillating said pivotally mounted support about its pivot, and a curved, size-reducing-chamber-providing member secured to said pivotally mounted support and having end portions making like angles with a tangent to its central portion and further having holding means for drawing the central portion thereof into compressive contact with said abutment portion of said support by the exertion of tension between said support portions and the opposite ends of said member in substantially the directions in which the latter extend.

ROBERT S. BUTLER.